Aug. 15, 1950     R. B. TEMPLE     2,519,326
ATTACHING MEANS FOR SURFACE HARDENED
PARTS SUCH AS PLOWS
Filed March 3, 1947
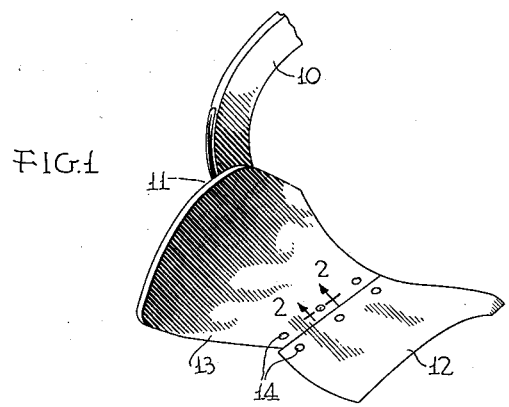
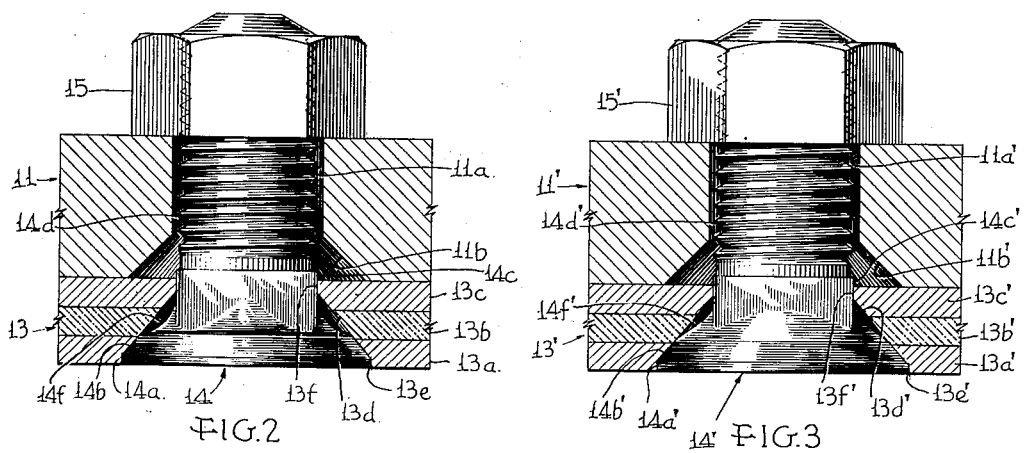
INVENTOR
Robert B. Temple
BY Maurice A. Crews
ATTORNEY

UNITED STATES PATENT OFFICE 2,519,326

ATTACHING MEANS FOR SURFACE HARDENED PARTS SUCH AS PLOWS

Robert B. Temple, Grosse Pointe, Mich., assignor to The Budd Company, Philadelphia, Pa., a corporation of Pennsylvania Application March 3, 1947, Serial No. 732,112

6 Claims. (Cl. 85—9)

This invention relates to attaching means for surface hardened metal parts, particularly for the earthworking parts of plows, and has for an object the provision of improvements in this art.

It is quite common to make the earthworking parts or elements of plows, such as share, moldboard and landside, of surface-hardened and soft-center steel. The hard and soft layers may be welded together. These parts are ordinarily secured on the supporting part, known as the standard, saddle or frog, by conical headed bolts provided with non-round shoulders to prevent turning while the nuts are being turned. The conical heads bear heavily on the lower hardened layer and start surface separation or cracks which lead to fractures and breakage of the whole part. The difficulty is increased by the necessity for enlarging the upper end of the hole in the supporting part to clear the non-round shoulder of the bolt, whereby the inner edges of the hardened lower portion of the secured part are left unsupported.

According to the present invention this trouble is relieved by providing a cooperating head and hole construction which brings the principal compressive pressure on the outer hardened layer and the soft center layer, leaving the hard lower layer largely free from excessive damaging stresses.

The invention is illustrated by the accompanying drawings, wherein:

Figure 1 is a side view of a plow bottom having earth engaging parts secured on the supporting parts in accordance with the present invention;

Figure 2 is a greatly enlarged section taken at one of the bolts, as on the line 2—2 of Fig. 1; and Figure 3 is a view similar to Fig. 2 but showing a modified form.

The plow shown in Fig. 1 includes a beam 10, a supporting part or saddle 11 (not shown in Fig. 1 but indicated by a dotted lead line) secured to the lower end of the beam and earth engaging or working parts including a share 12, a moldboard 13, and a landside (not shown). The share, moldboard and landside are secured to the saddle and to other supporting or connecting elements where necessary by bolts 14.

In Fig. 2 the saddle 11 is shown to be provided with a hole 11a for the bolt 14, the hole being enlarged at one end, as at 11b in conical shape, for clearing the non-round portion of the bolt.

The earth-engaging part (or moldboard 13 where the section is taken) may be made in three layers welded together. This type of part is known as a soft-center part. The outer layers 13a and 13c are hard and the center layer 13b is soft. A hole of generally conical shape 13d is formed in the part 13, a short round straight portion 13e parallel to the hole axis being provided at the outer end and a non-round, usually square, straight portion 13f parallel to the hole axis being provided at the inner end of the conical portion.

The bolt 14 is provided with an outer short round straight portion 14a parallel to the bolt axis, a conical seat portion 14b, a non-round, usually square straight shoulder portion 14c parallel to the bolt axis, a threaded portion 14d adapted to take a nut 15, and a relieved portion 14f between the conical portion and the non-round portion.

The straight round axially parallel portion 14a of the head of the bolt is disposed in the straight round axially parallel portion 13e of the hole, the non-round or polygonal axially parallel portion 14c of the bolt is disposed in the non-round axially parallel portion 13f of the hole, and the conical portion 14b of the bolt head is seated on the outer part of the conical portion 13d of the hole. The clamping compression of the bolt therefore falls upon the outer hard layer 13a and the intermediate soft layer 13b, leaving the inner hard layer 13c, due to the relieved portion 14f, free from pressure. Therefore, the inner edge of the lower layer 13c which overhangs the enlarged hole portion 11b is not pressed into this space and there is no tendency for it to break off or separate from the adjacent layer.

The form shown in Fig. 3 is very similar to that of Fig. 2 and the same reference numerals are used, with the addition of a prime ('), but in Fig. 2 the relieved portion 14f of the bolt is arcuate, whereas in Fig. 3 the relieved portion 14f' is straight and conical but inclined more steeply than the seating conical portion 14b'.

The outer straight axially parallel portion 14a of the bolt is made slightly longer than necessary to permit it to be ground flush with the outer surface of the part after the bolt has been tightened.

It has been found that breakage has been markedly reduced by the use of this invention but without any reduction in the clamping action of the bolts.

And while exemplary embodiments of the invention have been specifically illustrated and described, it is to be understood that there may be various other embodiments within the limits of the prior art and the scope of the subjoined claims.

What is claimed is:

1. A bolted construction of the character described comprising in combination, a first part having a bolt hole therein, a second part having a bolt hole therein and having an inner hard layer directly overlying the edges of the hole in the first part, the second part having a softer layer disposed outwardly of said hard layer and having a conical bolt seat portion in the hole outwardly of said hard layer and having a straight non-round axially parallel portion in said hard layer, and a bolt having a non-round axially parallel portion fitting in the non-round hard portion of the hole and a conical portion seating on the conical portion of the hole, the bolt between the non-round and conical portions being relieved from the surface of the hole for the purposes set forth.

2. A construction of the character described comprising in combination, a first part having a bolt hole therein, a second part having a bolt hole therein and having an inner hard layer directly overlying the edges of the hole in the first part, the second part having a softer layer disposed outwardly of said hard layer and having a conical bolt seat portion in the hole outwardly of said hard layer and having a straight non-round axially parallel portion in said hard layer, the second part having an outer hard layer disposed outwardly of the soft layer, said outer hard layer having a conical hole portion, and a bolt having a non-round axially parallel portion fitting in the non-round inner hard portion of the hole and a conical portion seating on the conical portion of the hole in the outer hard layer, the bolt between the non-round and conical portions being relieved from the surface of the hole for the purposes set forth.

3. A construction of the character described comprising in combination, a first part having a bolt hole therein, a second part having a bolt hole therein and having an inner hard layer directly overlying the edges of the hole in the first part, the second part having a softer layer disposed outwardly of said hard layer and having a conical bolt seat portion in the hole outwardly of said hard layer and having a straight non-round axially parallel portion in said hard layer, and a bolt having a non-round axially parallel portion fitting in the non-round portion of the hole and a conical portion seating on the conical portion of the hole, the bolt between the non-round and conical portions being relieved from the surface of the hole for the purposes set forth, the second part and bolt having straight round axially parallel interfitting portions disposed outwardly of said conical portions.

4. A construction of the character described comprising in combination, a first part having a bolt hole therein, a second part having a bolt hole therein and having an inner hard layer directly overlying the edges of the hole in the first part, the second part having a softer layer disposed outwardly of said hard layer and having a conical bolt seat portion in the hole outwardly of said hard layer and having a straight non-round axially parallel portion in said hard layer, and a bolt having a non-round axially parallel portion fitting in the non-round portion of the hole and a conical portion seating on the conical portion of the hole, the bolt between the non-round and conical portions being relieved from the surface of the hole for the purposes set forth, the hole in the first part being larger than the inner portion of the hole of the second part so that the inner edges of the second part extend unsupported over the hole of the first part, and the non-round axially parallel part of the bolt extending into the hole of said first part.

5. In a construction of the character described, a bolt having a straight round axially parallel portion, a conical seating portion below the straight round portion, a non-round straight axially parallel portion spaced at a distance below the conical portion, and a relieved inwardly tapered portion forming a gradual smooth connection between the conical seating portion and the non-round straight portion, the relieved portion being inwardly arcuate.

6. In a construction of the character described, a bolt having a straight round axially parallel portion, a conical seating portion below the straight round portion, a non-round straight axially parallel portion spaced at a distance below the conical portion, and a relieved portion between and connecting the conical seating portion and the non-round straight portion, the relieved portion being tapered inward on a steeper slope than the seating conical portion.

ROBERT B. TEMPLE.

REFERENCES CITED

The following references are of record in the file of this patent:

UNITED STATES PATENTS

| Number | Name | Date |
| --- | --- | --- |
| 898,711 | Wiard | Sept. 15, 1908 |
| 1,505,668 | Prigel | Aug. 19, 1924 |
| 1,529,210 | Parker | Mar. 10, 1925 |
| 1,830,554 | McMullin | Nov. 3, 1931 |
| 1,926,925 | Wescott | Sept. 12, 1933 |
| 2,167,558 | Upson | June 24, 1937 |
| 2,249,428 | Kempel | Nov. 24, 1939 |
| 2,337,777 | Seaholm | Dec. 28, 1943 |

FOREIGN PATENTS

| Number | Country | Date |
| --- | --- | --- |
| 756,979 | France | Oct. 2, 1933 |